H. C. BAINES.
INTERNAL COMBUSTION ENGINE.
APPLICATION FILED SEPT. 14, 1912.

1,096,665.

Patented May 12, 1914.

4 SHEETS—SHEET 2.

WITNESSES

INVENTOR
Henry C. Baines
BY
Raymond A. Parker
ATTORNEY

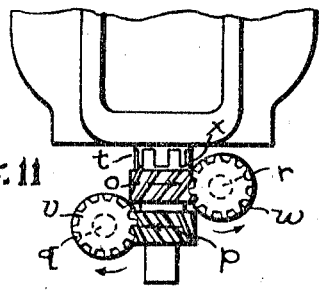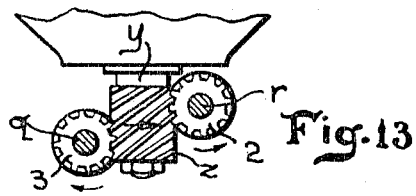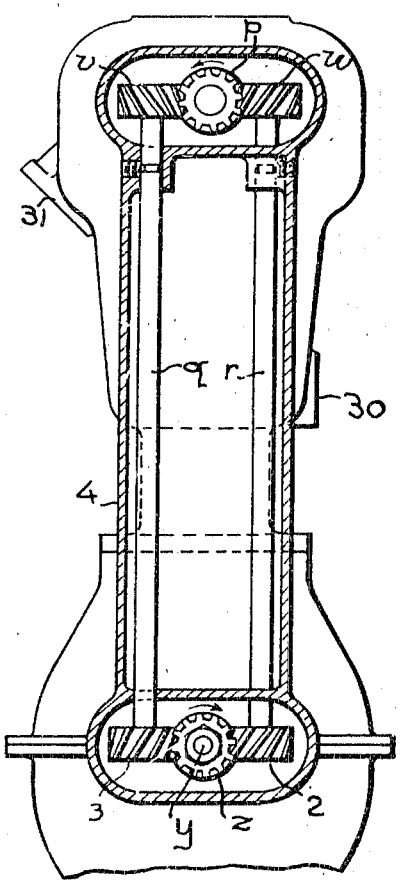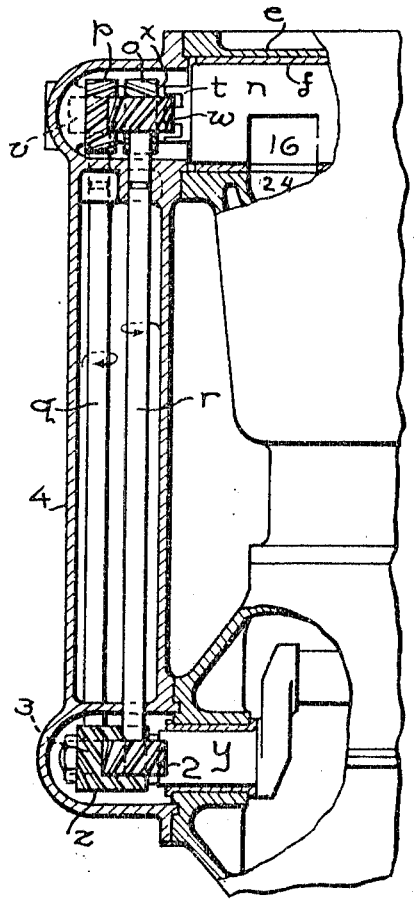

UNITED STATES PATENT OFFICE.

HENRY C. BAINES, OF PLYMOUTH, MICHIGAN, ASSIGNOR OF ONE-THIRD TO GEORGE B. BRINK, OF PLYMOUTH, MICHIGAN, AND ONE-THIRD TO HENRY E. EDWARDS, OF JACKSON, MICHIGAN.

INTERNAL-COMBUSTION ENGINE.

1,096,665.     Specification of Letters Patent.     Patented May 12, 1914.

Application filed September 14, 1912. Serial No. 720,357.

*To all whom it may concern:*

Be it known that I, HENRY C. BAINES, a citizen of the United States, residing at Plymouth, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

Figure 1:
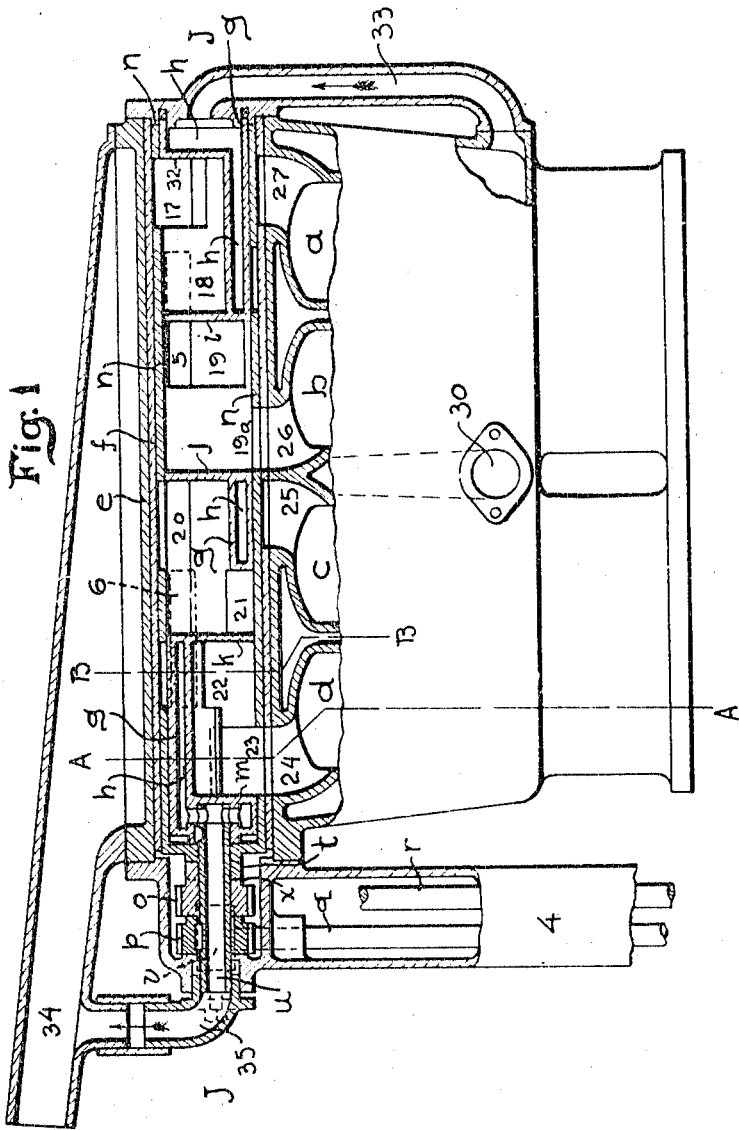
Figure 2:
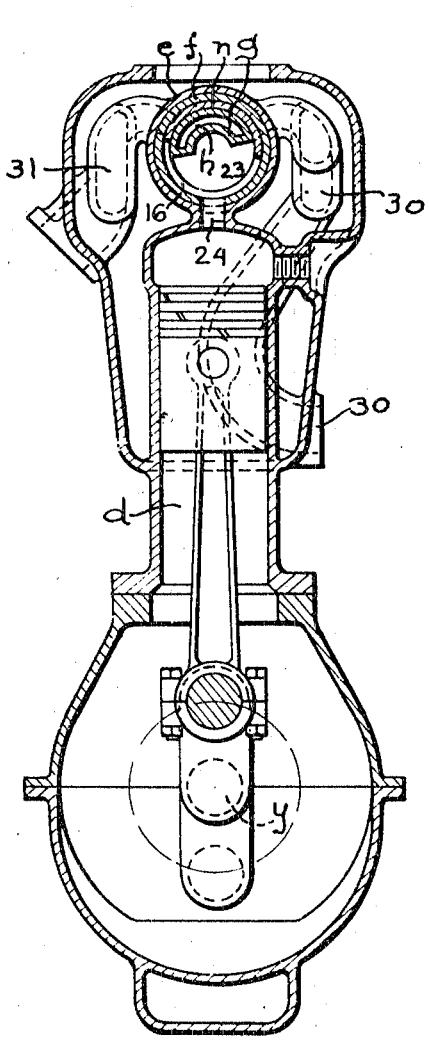
Figure 3:
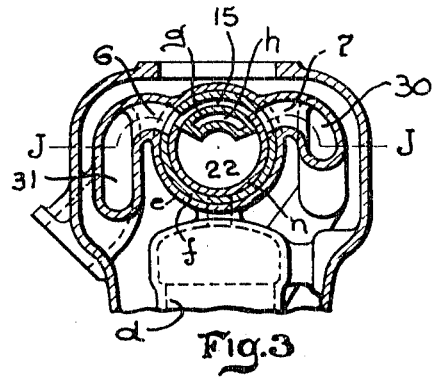
Figure 14:
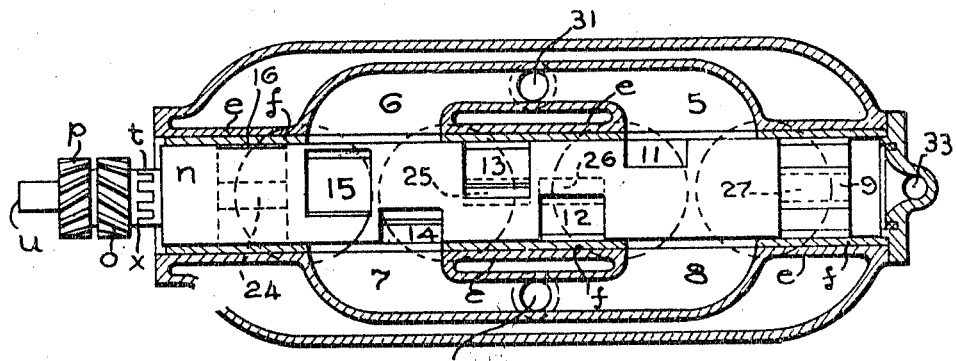
Figure 15:
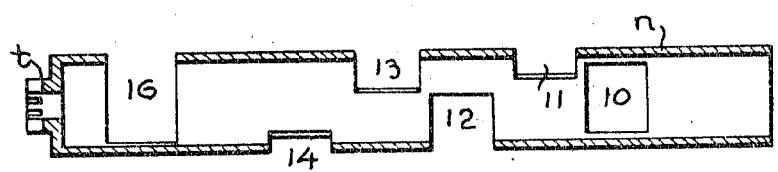
Figure 16:
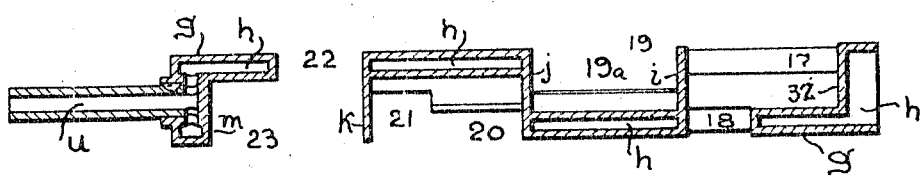

My invention relates to internal combustion engines and an object of my improvements is to provide an improved means for controlling the intake and exhaust of such an engine. I accomplish this object in the device illustrated in the accompanying drawings, in which, Figure 1, is a side elevation of the upper portion of a four-cylinder internal combustion engine embodying my invention, the upper part of the figure being in section. Fig. 2, is a section on the line A—A Fig. 1. Fig. 3, is a section on the line B—B Fig. 1. Figs. 4, 5, 6, 7, 8 and 9 are detail sections showing different positions of the valves. Fig. 10, is an end elevation of the engine partly in section. Fig. 11, is a top view of the parts shown in Fig. 10, the casing shown in section in Fig. 10 being omitted. Fig. 12 is a side elevation of the parts shown in Fig. 10 partly in section. Fig. 13, is a plan, partly in section, showing the relative arrangement of the gear wheels toward the bottom of Fig. 12. Fig. 14, is a section on the line J—J Fig. 3 and approximately on the line J—J Fig. 1, the valves being shown in full. Fig. 15, is a horizontal section of the outer valve shown in Fig. 14. Fig. 16, is a horizontal section of the inner valve.

$a$, $b$, $c$, $d$, are the cylinders of an internal combustion engine.

$e$, is a cylindrical casing extending above the cylinders $a$, $b$, $c$, $d$.

$f$, is a lining for the casing $e$.

$n$, is a sleeve-like cylindrical valve fitting and adapted to turn in the lining $f$.

$g$, is a cylindrical valve fitting and adapted to turn in the sleeve-like valve $n$. There is a tubular projection $u$ extending co-axially from the cylindrical valve $g$. The valve $g$ is provided with a water jacket $h$, and this water jacket has its outlet through the projection $u$. There is a sleeve-like projection $t$ extending from the valve $n$ and surrounding the projection $u$.

$o$, is a gear wheel having helical teeth. The gear wheel $o$ bears upon the projection $u$ and is provided with a hub $x$ and teeth which engage corresponding teeth on the sleeve-like projection $t$ from the valve $n$. (See Fig. 14.) $p$, is a gear wheel having helical teeth secured upon the projection $u$. $y$, is the main shaft of the engine. $z$, is a helical gear wheel on an outer end of the shaft $y$. $q$, $r$ are approximately vertical shafts having at their upper ends helical gear wheels $v$, $w$ engaging, respectively, the gear wheels $p$ and $o$. At the lower ends of the shafts $q$, $r$ there are helical gear wheels 2, 2 which engage upon opposite sides of the helical gear wheel $z$. By this arrangement of the gear wheels and shafts it will be seen that rotary motion will be communicated in opposite directions to the valves $n$ and $g$, and the gear wheels are so designed as to communicate the proper relative motion to the valves.

32, $i$, $j$, $k$, $m$, are partitions extending transversely across the valve $g$ and dividing the interior of said valve into four compartments, one compartment to each cylinder.

5 and 6 are exhaust ports extending through the wall of the casing $e$ and its lining $f$. 7 and 8 are intake ports passing through said walls opposite to the ports 5 and 6. The ports 5 and 6 open to an exhaust pipe 31 and the intake ports 7 and 8 communicate with an intake pipe 30.

9, 10, 11, 12, 13, 14, 15 and 16 are ports formed through the wall of the cylindrical sleeve-like valve $n$.

17, 18, 19, 19$^a$, 20, 21, 22 and 23 are ports formed through the wall of the rotary valve $g$.

24, 25, 26 and 27 are passages opening from the upper ends of the cylinders $d$, $c$, $b$, $a$.

The ports 5, 6, 7 and 8 open through the valve casing at an angular distance of approximately ninety degrees from that at which the passages 24, 25, 26, 27 open through said valve casing. The ports 6 and 7 open midway between the opening of the passages 24 and 25 and the ports 5 and 8 midway between the opening of the passages 26 and 27, longitudinally of the valves and valve casing.

The arrangement of the ports in the valve is the same for each cylinder except that they are so located that the cylinders shall have their proper relative time of action. It will be sufficient, therefore, to describe the action of the valves with reference to the cylinder $d$, as illustrated in Figs. 2 to 9 inclusive. It will be observed that the port 15 in the valve $n$ is adapted to communicate directly with the ports 6 and 7 but that the port 16 does not communicate with the ports 6 and 7 but registers with the opening from the passage 24 to put said passage into communication with the interior of the valves and that the port 15 only communicates with the passage 24 through the interior of the valves.

In Figs. 2 to 9 inclusive illustrating the action of the valves, the outer sleeve-like cylindrical valve $n$ has the motion in the direction of the hands of a watch and the inner rotary cylindrical valve $g$ has a motion in the opposite direction.

Figure 4:
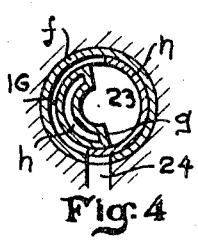
Figure 5:
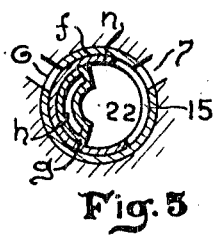
Figure 6:
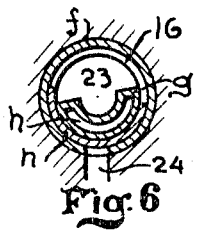
Figure 7:
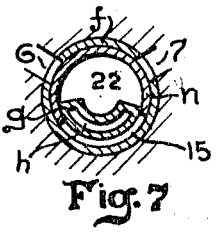
Figure 8:
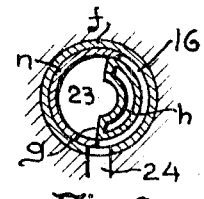
Figure 9:
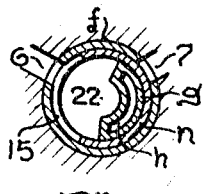

In Fig. 2, the intake stroke is about to commence. The port 16 registers with the opening to the passage 24 and the port 23 with the port 16. Farther along in the direction of the length of the valve, as shown in Fig. 3, the port 22 is about to be put into connection with the port 15 and these two ports are about to be put into connection with the intake port 7. As the piston descends the charge will be drawn through the intake port 30 into the upper part of the cylinder $d$. At the end of the intake stroke the valve $n$ covers the opening from the passage 24, as shown in Fig. 4, so that compression may take place in the cylinder. The relative positions of the ports 15 and 22 are shown in Fig. 5. At the end of the compression stroke the opening from the passage 24 is closed, as shown in Fig. 6, the relative arrangement of the ports 15 and 22 being shown in Fig. 7. At the end of the working stroke, the valve $n$ has uncovered the opening from the passage 24, as shown in Fig. 8, and the ports 23 and 16 are about to register thus putting the interior of the valves into communication with the passage 24. At this time the ports 22 and 15 register with each other, as shown in Fig. 9, and with the exhaust passage 6 so that as the piston rises in the cylinder $d$, the products of combustion will be expelled through the passage 31. The valve $g$ is open at its right hand end, as shown in Fig. 1, to a passage 33 through which a stream of water is flowing into the interior of said valve. The water from the passage 33 passes through the water jacket $h$ out through the bore of the projection $u$ into a passage 35, which last named passage communicates with the outlet passage 34 for the cooling water.

What I claim is:—

1. In an internal combustion engine, a water circulating system for cooling the same, two rotary co-acting valve members having ports adapted to register with each other, means to operate said valve members to control the intake and exhaust of the engine, one of said valve members having a water jacket located in said circulating system.

2. In an engine, a pair of adjacent cylinders, a cylindrical valve casing, a passage opening from each of said cylinders through the walls of said valve casing, two hollow cylindrical valves one fitting within the other located and adapted to rotate in said casing, one of said valves rotating and being adapted to turn in the other of said valves, ports through the walls of said valves adapted to register with each other, ports through the walls of said casing between the openings from said passages, the interior of the inner valve being divided into two compartments, the ports opening into one of said compartments being adapted to put the opening from one of said cylinders into communication with the ports through said casing, and the ports in the other of said compartments being adapted to put the passage from the other cylinder into communication with the ports through said casing to control the exhaust and intake from said cylinders, and means for rotating said cylindrical valves in opposite directions.

3. In an engine, a pair of cylinders, a cylindrical valve casing passages opening from each of said cylinders through the walls of said casing, a cylindrical valve $n$ fitting and adapted to turn in said casing, ports leading to and from said casing, said valve being provided with ports 13, 14, 15 and 16 through its walls, a second valve $g$ adapted to fit and turn in the valve $n$, said second valve being provided with ports 20, 21, 22 and 23, means for rotating said valves in opposite directions, to establish communication between the cylinders and the valve casing and to control the intake and exhaust of the engine.

4. In a multiple cylinder explosive engine, a single valve casing provided with inlet and exhaust ports disposed on opposite sides of the casing, a plurality of cylinders each provided with a single port communicating with the casing between respective inlet and exhaust ports, a rotary sleeve mounted in said casing and provided with spaced ports disposed to register with the inlet and exhaust ports simultaneously, a rotary valve within said sleeve provided with ports arranged in pairs, said valve having partitions between the respective ports, said partitions lying between adjacent cylinder ports, and means to rotate said valve and sleeve in opposite directions.

5. In an internal combustion engine, a water circulating system for cooling the same, a valve casing having communication with said cylinders, a valve mechanism arranged in the casing and including two rotary coacting ported valve members arranged one within the other, and adapted to establish and cut off communication between the cylinders and the valve casing and to control the intake and exhaust of the engine, the innermost of said ported valve members having a water jacket located in said circulating system.

In testimony whereof, I sign this specification in the presence of two witnesses.

HENRY C. BAINES.

Witnesses:
AGNES M. HIPKINS,
ELLIOTT J. STODDARD.